(12) United States Patent
Jones

(10) Patent No.: US 11,858,864 B2
(45) Date of Patent: *Jan. 2, 2024

(54) FOAMED GYPSUM BOARD HAVING VOIDS DISTRIBUTED THROUGHOUT THE GYPSUM CORE

(71) Applicant: CERTAINTEED GYPSUM OPERATING COMPANY, LLC, Herndon, VA (US)

(72) Inventor: Roger Jones, Palatka, FL (US)

(73) Assignee: CERTAINTEED GYPSUM OPERATING COMPANY, LLC, Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,582

(22) Filed: Jul. 15, 2020

(65) Prior Publication Data

US 2020/0339482 A1 Oct. 29, 2020

Related U.S. Application Data

(63) Continuation of application No. 15/818,209, filed on Nov. 20, 2017, now Pat. No. 10,752,558.

(51) Int. Cl.
| | |
|---|---|
| *C04B 40/00* | (2006.01) |
| *B28B 19/00* | (2006.01) |
| *C04B 18/02* | (2006.01) |
| *C04B 28/14* | (2006.01) |
| *C04B 38/10* | (2006.01) |
| *B28C 5/38* | (2006.01) |

(Continued)

(52) U.S. Cl.
CPC ...... *C04B 40/0028* (2013.01); *B28B 19/0092* (2013.01); *B28C 5/381* (2013.01); *C04B 18/027* (2013.01); *C04B 28/14* (2013.01); *C04B 38/10* (2013.01); *C04B 2111/0062* (2013.01); *C04B 2111/40* (2013.01)

(58) Field of Classification Search
CPC ... C04B 40/0028; C04B 18/027; C04B 28/14; C04B 38/10; C04B 2111/0062; C04B 2111/40; B28B 19/0092; B28C 5/381
See application file for complete search history.

(56) References Cited

U.S. PATENT DOCUMENTS

| | | | |
|---|---|---|---|
| 2,985,219 | A | 5/1961 | Summerfield |
| 5,683,635 | A | 11/1997 | Sucech et al. |

(Continued)

*Primary Examiner* — Christopher W Raimund
(74) *Attorney, Agent, or Firm* — Pillsbury Winthrop Shaw Pittman LLP

(57) ABSTRACT

A system and method for introducing a slurry mixture for making gypsum board is disclosed. The system includes a mixer for mixing slurry and directing it to an exit gate, a foam injector for injecting foam into the slurry, and a canister connected to the mixer for inducing swirl to the slurry. The system also includes an elongated hose and an optional adapter for depositing the slurry onto paper to form the board. Ends of the elongated hose are coupled to the canister and to the inlet of the adapter. Slurry is directed from the canister, through the hose, and into the adapter for exiting its outlet. Optionally, a mixing boot and/or elbow joints may be included. Use of the hose and adapter enhances the flexibility of the system, including moving the mixer offline or adjacent to the paper or belt, and improves foam blending in the slurry mixture.

12 Claims, 9 Drawing Sheets

(51) Int. Cl.
    *C04B 111/40*     (2006.01)
    *C04B 111/00*     (2006.01)

(56) References Cited

U.S. PATENT DOCUMENTS

| | | |
|---|---|---|
| 6,207,055 B1 | 3/2001 | Satterfield et al. |
| 6,361,201 B1 | 3/2002 | Russell et al. |
| 6,494,609 B1 | 12/2002 | Wittbold et al. |
| 6,604,849 B2 | 8/2003 | Lin et al. |
| 6,742,922 B2 | 6/2004 | Shrader et al. |
| 7,296,919 B2 | 11/2007 | Petersen et al. |
| 7,311,436 B2 | 12/2007 | Barker et al. |
| 7,654,807 B2 | 2/2010 | Gannaway et al. |
| 7,690,834 B2 | 4/2010 | Nakamura et al. |
| 7,718,019 B2 | 5/2010 | Wittbold et al. |
| 8,016,960 B2 | 9/2011 | Wittbold et al. |
| 8,066,421 B2 | 11/2011 | Sethuraman et al. |
| 8,685,188 B2 | 4/2014 | Yamaji et al. |
| 9,296,124 B2 | 3/2016 | Rago et al. |
| 2003/0117891 A1 | 6/2003 | Wittbold |
| 2003/0188670 A1* | 10/2003 | Martin .................... C04B 28/14 106/781 |
| 2008/0101150 A1 | 5/2008 | George |
| 2009/0122637 A1 | 5/2009 | Kruyer |
| 2011/0054053 A1* | 3/2011 | Lee ........................ C08J 9/0066 523/122 |
| 2011/0228630 A1 | 9/2011 | Gillis et al. |
| 2012/0167805 A1 | 7/2012 | Wittbold et al. |
| 2013/0100759 A1 | 4/2013 | Wittbold |
| 2014/0029372 A1 | 1/2014 | Roark, Jr. |
| 2015/0231799 A1 | 8/2015 | Wittbold et al. |
| 2015/0315074 A1 | 11/2015 | Ueno et al. |
| 2015/0328607 A1 | 11/2015 | Wittbold et al. |
| 2016/0317983 A1 | 11/2016 | Jones |

\* cited by examiner

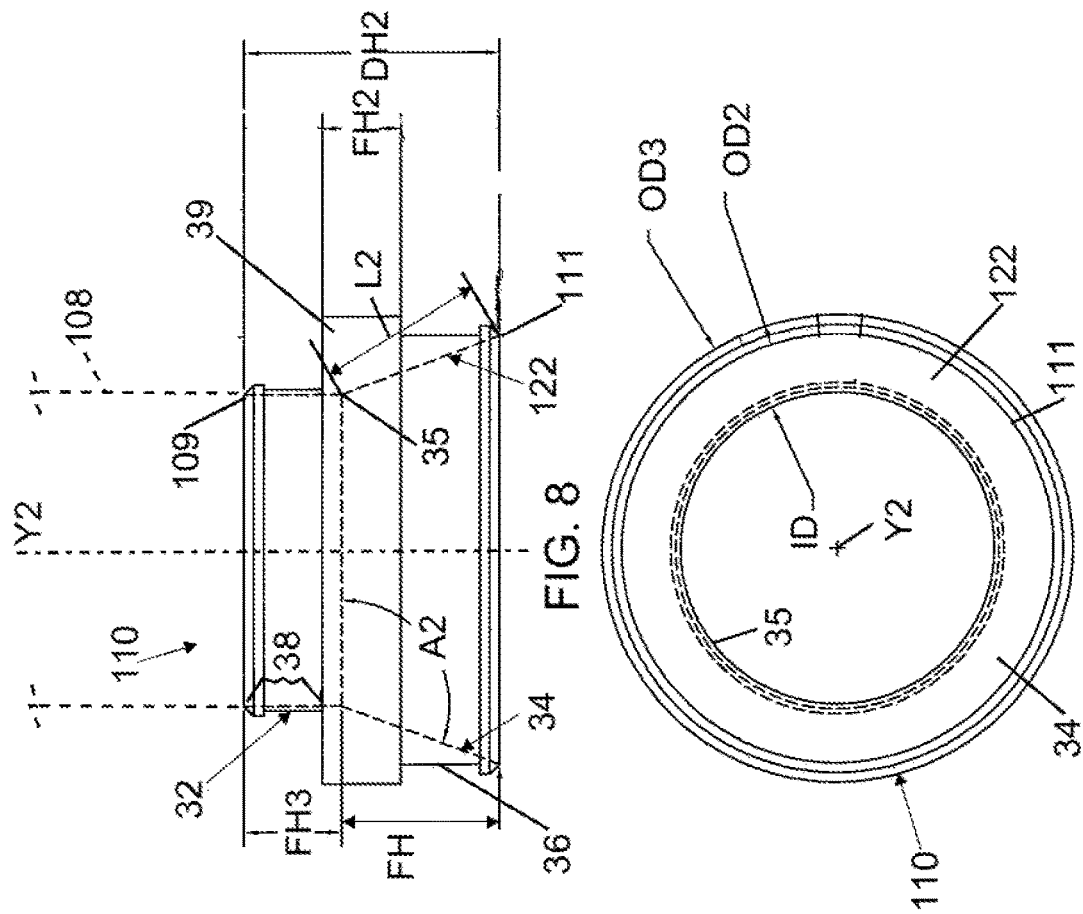

FOAMED GYPSUM BOARD HAVING VOIDS DISTRIBUTED THROUGHOUT THE GYPSUM CORE

CROSS-REFERENCE TO RELATED APPLICATIONS

This application is a continuation of U.S. application Ser. No. 15/818,209, filed Nov. 20, 2017. The contents of this application is hereby is incorporated herein by reference in its entirety.

BACKGROUND

Field

The present disclosure is generally related to an apparatus, system, and method for mixing and depositing a slurry mixture to form gypsum board.

Description of Related Art

Conventionally, in the art of making drywall, it is generally known to and blend foam into gypsum slurry. Generally, the mixture of materials are combined and swirled to create a vortex in a mixing device of a gypsum board making system. It is desirable to form a consistent, homogeneous mixture before depositing the slurry onto the paper, to reduce any potential for quality issues which may include, for example, blisters, splits, blows, voids, poor core formation, uneven drying, and low finished product strengths.

SUMMARY

It is an aspect of this disclosure to provide a system for introducing a slurry mixture for making gypsum board. The system includes: a mixer constructed and arranged to mix slurry and direct the mixed slurry to an exit gate; a foam injector constructed and arranged to inject foam into the mixed slurry to form a slurry mixture; a canister connected to the mixer and constructed and arranged to induce a swirl to the slurry mixture; and an adapter constructed and arranged to receive the slurry mixture. The adapter has a receiving inlet for receiving the slurry mixture and a deposit outlet. The system further includes an elongated hose having a first end coupled to the canister and a second end attached to the receiving inlet of the adapter for communicating the slurry mixture from the canister to the adapter, so that the slurry mixture is directable from the canister, through the elongated hose, and into the receiving inlet of the adapter, for exiting its deposit outlet and depositing onto paper to form the gypsum board.

Another aspect provides a method for mixing a slurry mixture for making gypsum board. The method may use a system including a mixer constructed and arranged to mix slurry and direct the mixed slurry to an exit gate, a foam injector constructed and arranged to inject foam into the mixed slurry to form a slurry mixture, a canister connected to the mixer and constructed and arranged to induce a swirl to the slurry mixture; an adapter constructed and arranged to receive the slurry mixture, the adapter having a receiving inlet for receiving the slurry mixture and a deposit outlet; and an elongated hose having a first end coupled to the outlet of the canister and a second end attached to the receiving inlet of the adapter for communicating the slurry mixture from the canister to the adapter. The method includes: mixing the slurry at a first flow rate; injecting foam into the mixed slurry to form the slurry mixture; inducing a swirl to the slurry mixture using the canister; and depositing the slurry mixture via the deposit outlet of the adapter onto paper to form the gypsum board. In the method, the slurry mixture is directed from the canister, through the elongated hose, and into the receiving inlet of the adapter before the depositing onto the paper.

Other features and advantages of the present disclosure will become apparent from the following detailed description, the accompanying drawings, and the appended claims.

BRIEF DESCRIPTION OF THE DRAWINGS

FIGS. 8 and 9 are detailed side and top views, respectively, of an adapter having a second funnel body therein configured for use in the system of FIG. 1 in accordance with another embodiment.

DETAILED DESCRIPTION OF THE PREFERRED EMBODIMENT(S)

As noted in the background, slurry and foam should be mixed together as homogenously as possible in order to produce a gypsum board (or plasterboard) product of high quality (i.e., a finished gypsum board product that lacks blisters, blows, voids, and poor core formation). It is generally known that pushing slurry or liquids through a pipe or hose will create vortexes, eddies, and turbulence that promote the mixing of materials. If two materials (e.g., gypsum and foam) of different densities are both injected into a hose or pipe of adequate length, a slurry of a different density (the average of the two originals) is produced. In order to better blend the gypsum slurry and foam together in a more homogeneous fashion, and result in a better product, this disclosure aims to take advantage of blending properties of a hose, along with a canister and funnel. In addition, using a hose in the herein disclosed manner allows for flexibility in the movement and positioning of the mixer relative to other parts of the system, among other benefits, discussed later.

Throughout this disclosure, reference to a "slurry mixture" refers to a mixture of at least slurry and (aqueous) foam. Also, the terms "approximately," "substantially,"

"about," and similar terms generally refer to values and/or ranges that include the identified value within a margin of 10%, and any values therebetween. In addition, reference to a "product" refers to a formed gypsum board and is not intended to be limited with regards to size or dimension. Discussion with regards to ½ inch and ⅝ inch products refers to a thickness of the product/formed gypsum board and such thicknesses are exemplary.

Figure 1:
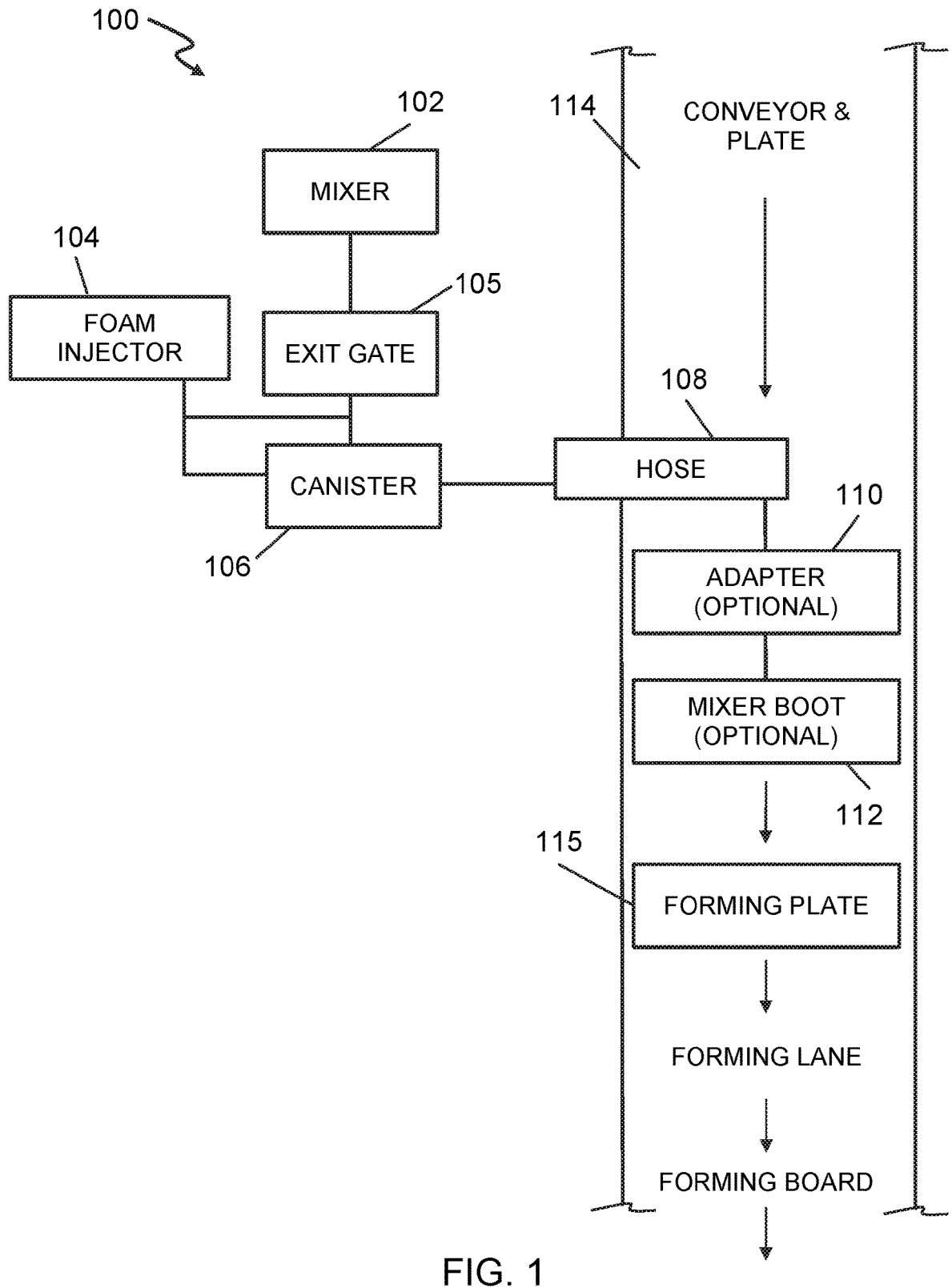
FIG. 1 is a schematic diagram of a system in accordance with an embodiment of this disclosure.

FIG. 1 illustrates a schematic representation of a system 100, in accordance with an embodiment of this disclosure, that utilizes an elongated hose and an optional adapter to deposit a slurry mixture and for making gypsum board. Generally, the system 100 of FIG. 1 includes a mixer 102, a foam injector 104, a canister 106, an elongated hose 108, an adapter 110, an optional mixer boot 112, and a board, surface, or table with a conveyor 114 (e.g., in the form of a belt) with paper that is moved or run therealong and a mixture is deposited to form gypsum board. The mixer 102 is constructed and arranged to mix gypsum slurry to a first flow rate. Although not shown or described in great detail herein, one of ordinary skill in the art should understand that the mixer 102 includes at least a mixing chamber, a rotor, and an outlet, as well as a material supply (e.g., calcium sulphate hemi-hydrate) and a water supply (or other liquid or fluid) associated therewith, and any number of orifices or nozzles. The mixer may be designed such that dead zones are limited in the mixing chamber so that risk of clogging the mixer is reduced or eliminated. A tubular element and a collecting element may connect to an outlet orifice in the mixer, and a pressure regulating element and transport element may be provided on the mixer.

The mixed slurry is directed from the mixer 102 to an exit gate 105. A foam injector 104 injects foam into the mixed slurry to form a slurry mixture. The foam injector is constructed and arranged to inject the foam into the mixed slurry at a point between the mixer 102 and the canister 106, into the canister 106, and/or into the elongated hose 108. In one embodiment, foam is injected by injector 104 in the exit gate 105 or to the exit gate passageway to form the slurry mixture. In another embodiment, foam may be injected by injector 104 into the canister 106, e.g., into or through a side or a top of the canister 106, in either one or two locations (e.g., see FIG. 2), via foam injection slot(s) or through a grid of smaller holes (e.g., that are covered with an injection manifold) or through a tube or pipe. In yet another embodiment, foam may be injected into both (alternatively or simultaneously) the exit gate 105 or exit gate passageway and the canister 106.

Figure 10:
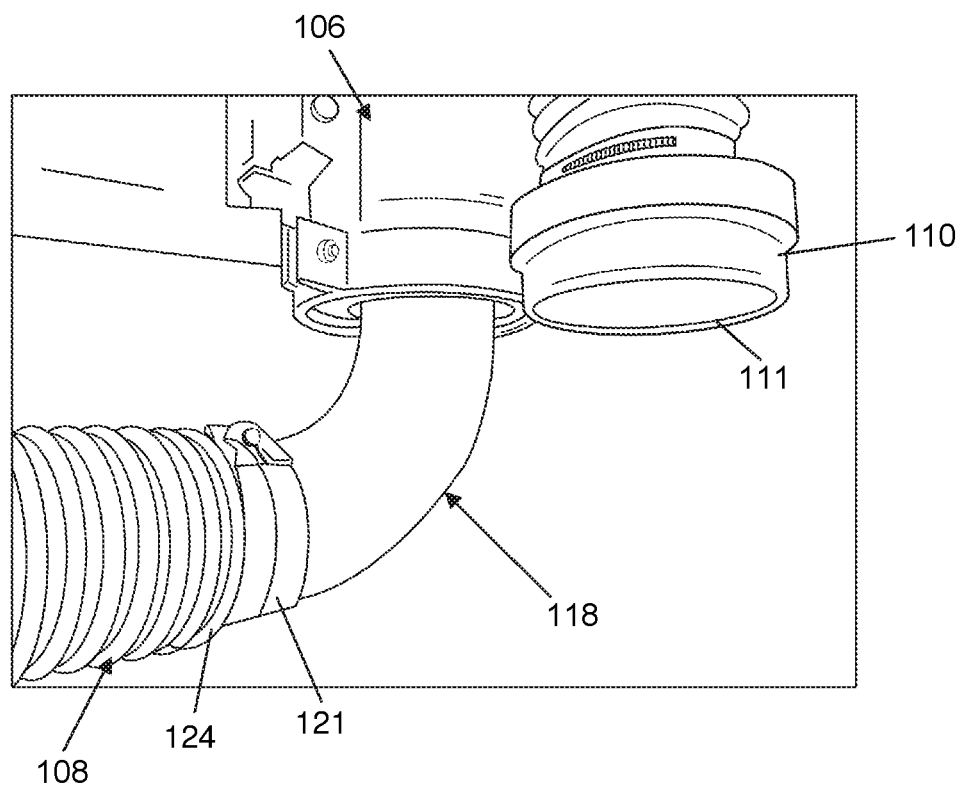
FIG. 10 shows a detailed view of an exemplary arrangement of a canister, adapter, and hose of the system of FIG. 1.

From the exit gate 105, the slurry mixture may be directed to the canister 106. The canister 106 is connected to the mixer 102 (see, e.g., FIG. 2, FIG. 3). The canister 106 induces a swirl to the slurry mixture. In an embodiment, the mixer 102 is constructed and arranged to mix slurry to a first flow rate. The mixture may optionally flow at a second flow rate after being introduced into the canister 106. In an embodiment, the canister 106 is constructed and arranged to reduce the flow of the slurry mixture, such that the second flow rate (e.g., out of the canister 106) is lower than the first flow rate (at which it is mixed and output by mixer 102). In some cases, the slurry mixture flows at the same flow rate. From the canister 106, the slurry mixture is directed to elongated hose 108. The elongated hose 108 may be connected to the canister 106 at a first end 124, as shown in FIG. 10 (as illustrated here, an optional elbow connector 118 is attached to and in between the canister 106 and end 124 of hose 108). In one embodiment, the end 124 of the hose 108 is directly connected to the canister 106. In other embodiments, the end 124 of the hose 108 may be connected to the canister 106 using a hose barb 121, elbow connector 118, and/or other connection device(s) (e.g., see FIGS. 4-7). The slurry mixture is further blended (e.g., with the injected foam) as it moves at a flow rate through the elongated hose 108 such that a well-blended mixture exits a second end 126 of the hose. In an embodiment, the slurry mixture enters the hose 108 at first end 124 at a first flow rate and exits the hose 108 at second end 126 at a second flow rate. In one embodiment, the first flow rate and second flow rate relating to the hose 108 are substantially equal or the same rate. In another embodiment, the second flow rate out of the hose 108 is lower than the first flow rate. In yet another embodiment, the second flow rate of the hose 108 is higher than the first flow rate.

The second end 126 of the hose 108 may be optionally attached to a receiving inlet 109 of the adapter 110 constructed and arranged to receive the slurry mixture, for communicating the slurry mixture from the canister 106 to the adapter 110. Accordingly, the slurry mixture may be directable from the canister 106, through the elongated hose 108, and into the receiving inlet 109 of the adapter 110. The adapter 110 has a deposit outlet 111 through which the slurry mixture exits and is deposited onto paper moving on the board or conveyor 114 to form the gypsum board. In accordance with some embodiments, use of the adapter 110 is optional; instead, the second end 126 of the hose 108 may be positioned to deposit slurry mixture directly onto paper on conveyor 114, for example.

Generally, the canister 106 has a body that includes an inlet for receiving the slurry mixture and an outlet for outputting the slurry mixture. In one embodiment, the canister 106 includes one or more baffles therein to promote blending and/or mixing of the slurry mixture (e.g., with foam). Similarly, grooves or steps may be formed in a body of the canister to promote blending and/or mixing. Structural features of the canister 106 are generally known, and thus not further explained herein.

Figure 2:
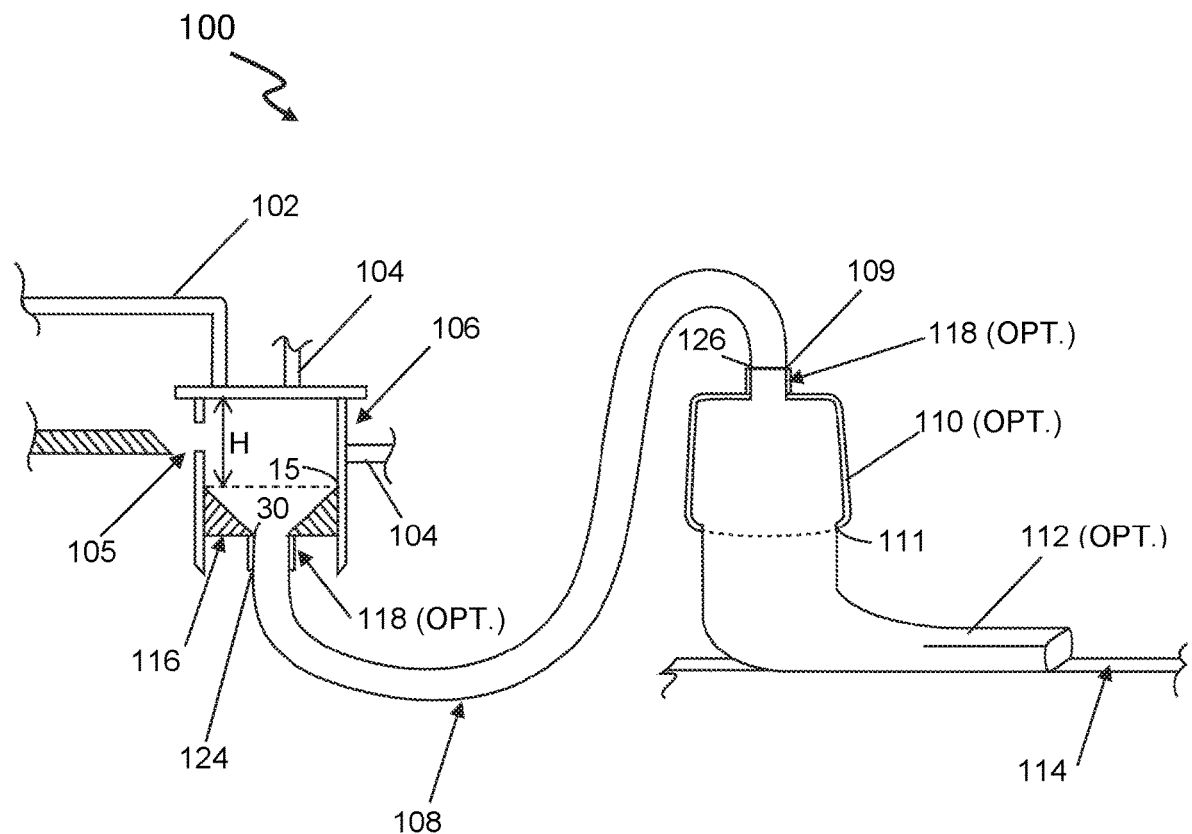
FIG. 2 illustrates parts of the system of FIG. 1 in accordance with one embodiment.
Figure 3:
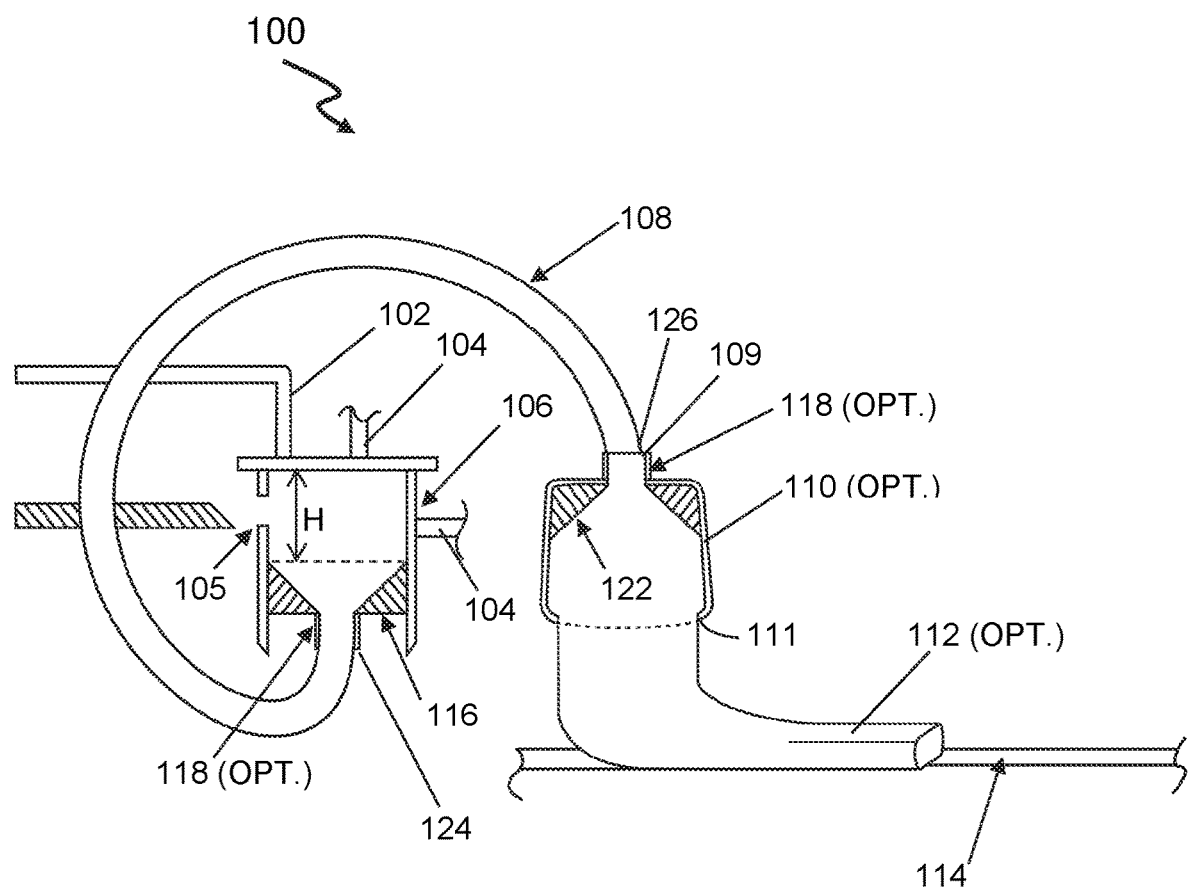
FIG. 3 illustrates parts of the system of FIG. 1 in accordance with another embodiment.

In an embodiment, a mixer boot 112 is optionally provided in the system 100 and receives the slurry mixture exiting from hose 108 or the outlet 111 of the adapter 110, such as shown in FIG. 2 or 3, for example. The mixer boot 112 may slow or reduce a speed of the slurry mixture and may be positioned or configured to deposit the slurry mixture onto (or in between) paper that is being conveyed by conveyor 114, to make the gypsum board. The mixer boot 112 has an inlet for receiving the slurry mixture, a body that directs the slurry mixture (e.g., in a downward and a lateral or parallel direction to the moving paper), and an outlet for depositing the slurry mixture, e.g., onto the paper. Structural features of such a mixer boot 112 are generally known, and thus not further explained herein. In accordance with an embodiment, at least a size of the inlet of the mixer boot 112 matches or is similar to the size/diameter of the elongated hose 108. In one embodiment, the size and dimensions of the mixer boot 112 may be dependent an amount or desire at which to slow/reduce a speed of the slurry mixture that is received from the hose 108, before depositing the slurry mixture onto the paper (i.e., the speed at which the slurry mixture enters the inlet of the mixer boot may be greater than the speed at which the slurry mixture exits the outlet for depositing onto the paper). In an embodiment, the mixer boot 112 may be attached, connected, or coupled to a second end (outlet) of the elongated hose 108. In one embodiment, the mixer boot 112 is attached directly to the hose 108. An outlet of the mixer boot 112 may be positioned to deposit the slurry mixture in substantially parallel manner to the paper on conveyor 114, in accordance with an embodiment. In an embodiment, the outlet of the mixer boot 112 is parallel to the paper.

Once the slurry mixture is deposited onto the paper on the conveyor 114 (via hose 108, adapter 110, or mixer boot 112), as generally understood by one of ordinary skill in the art, a top sheet of paper may be applied on top of the slurry mixture deposited onto the moving paper of the conveyor 114, to sandwich the mixture therebetween. The sandwiched slurry mixture may run through a forming system which may include a forming plate 115, a forming lane, and/or forming board section. The forming plate 115 may include one or more surfaces, rollers, or plates positioned in relation to the moving paper(s) and slurry mixture, and is designed to apply an amount of pressure to the sandwiched product to form a gypsum board (or product) of desired thickness. Then, as generally known in the art, the formed board may be subject to one or more of: finishing (e.g., on its edges), cutting (e.g., into panels), and/or drying, e.g., via a drying system (e.g., an oven or hot air distribution system).

The elongated hose 108 has a length that is sufficient to impart the slurry mixture with a substantially laminar flow between its first end and its second end, in accordance with an embodiment. Producing a substantially laminar flow of the slurry mixture via the hose 108 reduces turbulence within the flowing slurry mixture that is received from the canister, while still allowing for flow at a desired flow rate or velocity and further blending as it moves through the hose length (e.g., curved inner sides of the hose may impart smaller vortexes, eddies, and/or the like to the slurry mixture as it moves through to the second end). The elongated hose 108 thus also promotes better mixing and blending of the gypsum slurry mixture and foam together in a more homogeneous fashion. In one embodiment, the length of the elongated hose 108 is such that the laminar flow of the slurry mixture is maintained from at least a mid-length of the elongated hose to the second end of the elongated hose. In one embodiment, the length of the elongated hose 108 is at least 3 m. In another embodiment, the length of the elongated hose 108 is less than 6 m. In an embodiment, the length of the elongated hose 108 is approximately 2 m to approximately 6 m (both inclusive).

In an embodiment, the elongated hose 108 is made of a substantially kink-free, flexible material. An inner diameter D of the hose 108 may vary. In accordance with an embodiment, inner diameter D of the hose 108 is in a range from approximately 2 inches to approximately 4 inches. In an embodiment, the elongated hose 108 and the receiving inlet 109 of the adapter 110 have a substantially similar inner diameter. In an embodiment, the receiving inlet 109 may have a diameter AD or width in a range from approximately 2 inches to approximately 4 inches. In addition, in accordance with an embodiment, the canister 106, hose barb 121, elbow connector 118, and/or other connection device(s) used to connect the first end 124 of the hose 108 may have a similar diameter or width as the inner diameter of the elongated hose 108.

A position or an arrangement of the length of the hose 108 between its first and second ends 124, 126 is not intended to be limited. The elongated hose may be positioned in the system 100 and/or dimensioned to direct the slurry mixture in at least two different directions between the first end 124 and the second end 126. In one embodiment, the at least two different directions are opposite or perpendicular directions. In an embodiment, a portion of the elongated hose 108 is positioned and/or dimensioned to direct the slurry mixture vertically and away from a plane formed by the paper. In accordance with an embodiment, a portion of the length of the hose 108 is positioned in a loop. In one embodiment, schematically shown in FIG. 3, for example, the loop of the hose 108 is configured such that the flow of slurry mixture is directed from the canister 106 horizontally, upwardly, and then downward (vertically) again within the hose 108. In another embodiment, for example, the loop of the hose 108 is configured such that the flow of slurry mixture is directed substantially horizontally and away from the canister 106 and then around in a horizontally configured loop before directed outwardly to the paper on the conveyor 114. In yet another embodiment, the length of the hose 108 includes at least one portion that may be positioned substantially vertically. In another embodiment, the length of the hose 108 includes at least one portion that may be positioned substantially horizontally, e.g., relative to the paper. In yet another embodiment, the hose 108 has a length wherein at least a first portion that may be positioned in a substantially vertical direction and a second portion that may be positioned in a substantially horizontal direction. A second end 126 of the hose 108 may be positioned substantially parallel to the paper on conveyor 114, in accordance with an embodiment. The positioning and configuration of the hose 108 may be adjusted in any number of ways, and is not intended to be limiting. As discussed throughout this disclosure, the hose 108 provides flexibility with regards to its positioning and direction, e.g., to affect the movement of the slurry, as well as flexibility with regards to positioning of other parts of the system 100. It should be understood that the length of the hose 108 may be angled, looped, or positioned in a number of different directions, with at least a portion of the hose 108 positioned such that the slurry mixture flows in a substantially laminar direction.

The flexibility of the elongated hose 108 with regards to its and positioning in the system 100 accordingly provides the ability to position the mixer 102 offline from the other system components, such that it may be positioned substantially adjacent to the plate, board or conveyor 114 that positions the paper for receipt of the slurry mixture. An example of the positioning of mixer 102 relative to the plate, board or conveyor 114 is shown in FIG. 1.

As explained in greater detail below, in accordance with an embodiment, the canister 106 may include a funnel body 116 therein to further induce a swirl into the slurry mixture as it flows therethrough. FIGS. 2 and 3 illustrate embodiments of system 100 with a funnel body 116 connected to the canister 106. The entire canister assembly, including its funnel (if used), is stationary within the system. The height H between a top of the canister 106 and an inlet 15 of the funnel body 116 may be approximately 7.0 inches. In accordance with one embodiment, the height H is approximately 6 inches to approximately 8 inches.

Figure 5:
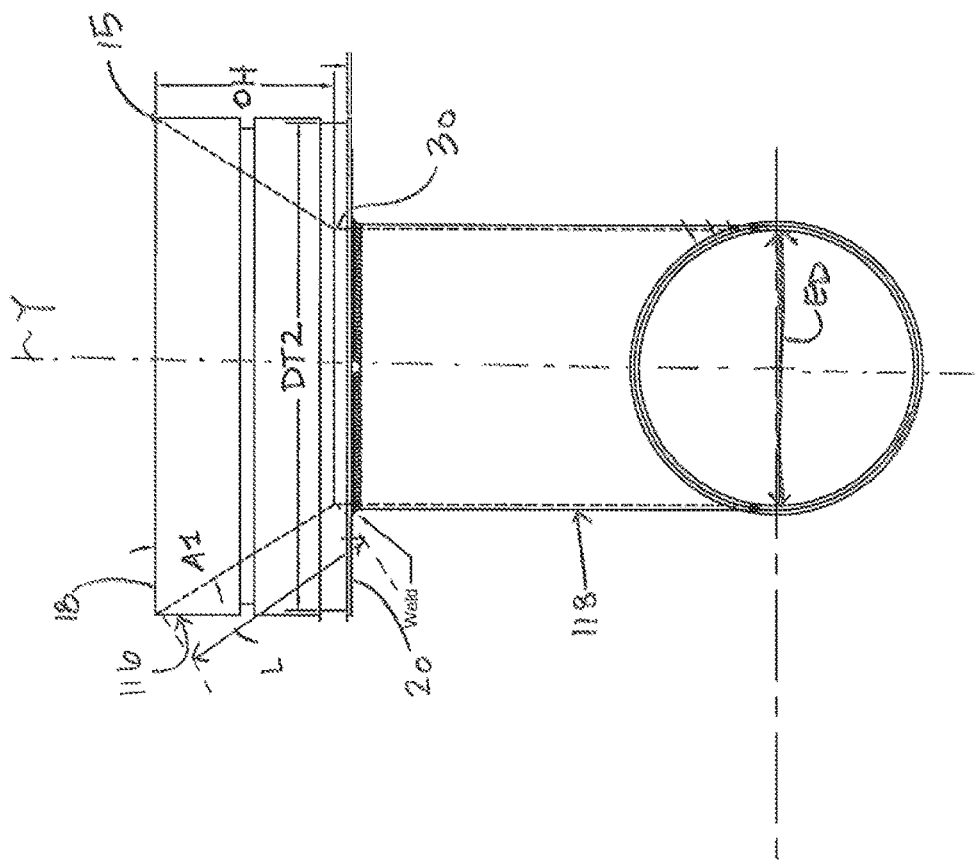
FIGS. 4 and 5 are detailed side and front views, respectively, of a first funnel body and an elbow joint configured for use in the system of FIG. 1 in accordance with an embodiment.
Figure 4:
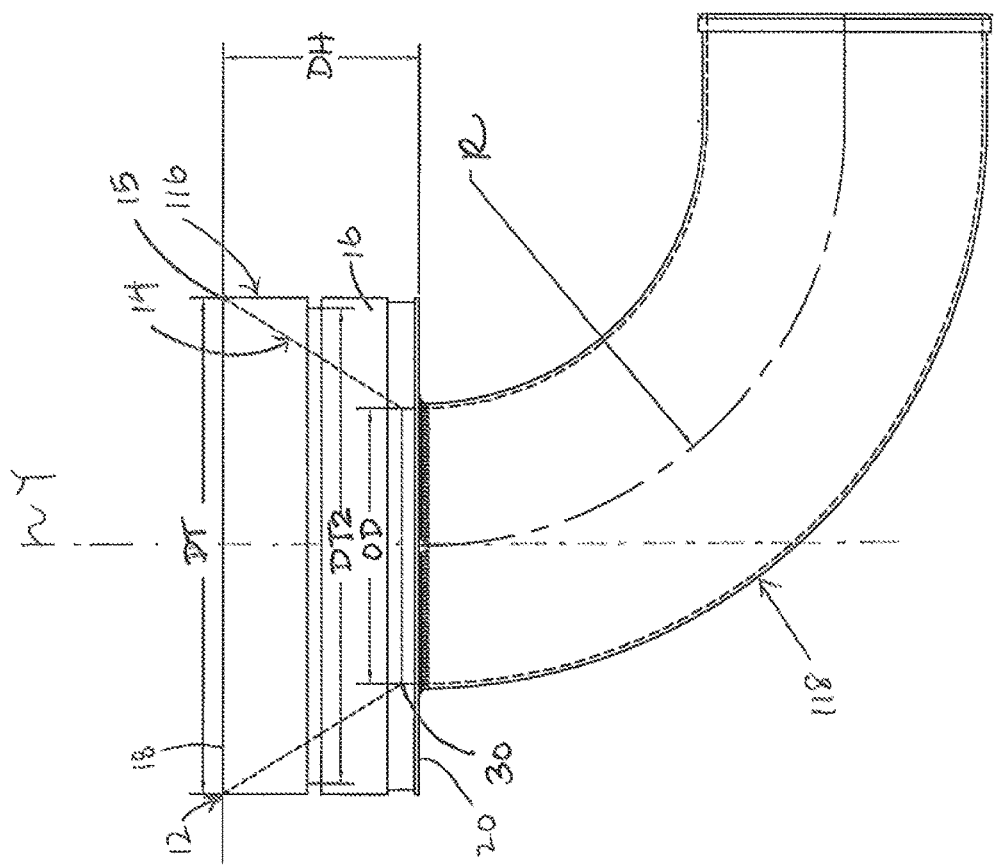

FIGS. 4-5 illustrate views of the funnel body 116 that may be connected to or contained within the canister 106 for inducing turbulence into a slurry mixture, in accordance with this disclosure. The funnel body 116 has a body portion 12 that may be formed as a separate and distinct structure that is connected to and/or inserted into the body of the canister 106, e.g., near or at its outlet. In another embodiment, the body portion 12 is formed with the canister 106. The funnel body 116 and canister 106 may be integrally formed. The body portion 12 (or body 12) of funnel body 116 has an inner wall 14, an outer wall 16, an inlet opening 15, and an outlet opening 30. The inner wall 14 is generally spaced from the outer wall 16 and provided at an angle relative to a longitudinal axis Y (described further later) to direct the slurry mixture poured into the inlet 15 towards the outlet 30. The inlet opening 15 is provided at a top portion 18 of the body portion 12 for receiving the slurry mixture from the canister 106, and an outlet opening 30 may be provided at or near a bottom portion 20 of the body 12. The inner wall 14 may extend between the inlet opening 15 at the top portion 18 of the body 12 and the outlet opening 30 near a bottom portion 20. In an embodiment, the outlet opening 30 has a cross-section that is smaller than a cross-section of the funnel inlet opening 15. In one embodiment, the outlet opening 30 has a smaller diameter than a diameter of the funnel inlet opening 15. In use, the slurry mixture is introduced into the funnel body 116 via the inlet opening 15 from the body of the canister 10, and, since the inner wall 14 extending between the inlet 15 and the outlet 30 is angled, it generally swirls the flowing slurry mixture within the body 12 downwardly towards the outlet opening 30.

The body portion 12 may have an overall height DH (see FIG. 4) of approximately 2.75 inches. In accordance with an embodiment, the overall height DH may be approximately 2.5 inches to approximately 4 inches (both inclusive). The outlet opening 30 of funnel body 116 may be provided at an outlet height OH (see FIG. 5) measured from a top edge of the body 12 to an edge of the outlet opening 30. The outlet height OH may be approximately 2.5 inches. In accordance with an embodiment, the outlet height OH may be approximately 2.0 inches to approximately 3.75 inches (both inclusive). In another embodiment, the outlet opening 30 is provided at the bottom 20 of the body 12, and the outlet height OH may be approximately 2.75 inches.

As shown in FIG. 4, the top edge of the funnel body 12 has a top dimension DT (e.g., width). The inlet opening 15 has an opening dimension DT2 at the top 18 of the body 12. In an embodiment, the opening dimension DT2 of the inlet opening 15 is slightly smaller than the top dimension DT of the top edge. In an embodiment, the top dimension DT is approximately 7 inches. In accordance with an embodiment, the top dimension DT is approximately 6 inches to approximately 8 inches (both inclusive). In an embodiment, the opening dimension DT2 is approximately 6.7 inches to approximately 6.85 inches (both inclusive). In accordance with an embodiment, the opening dimension DT2 is approximately 6.5 inches to approximately 7 inches. In another embodiment, DT and DT2 may be equal or substantially equal. Of course, any dimensions noted above may be adjusted based on the system or apparatus being used, as well as the desired dimension of the outlet opening 30 (discussed below).

The inner wall 14 of the funnel body 116 may be provided at an acute angle relative to a longitudinal axis Y that extends through a center of the outlet opening 30, for example. In an embodiment, the inner wall 14 has a slope of approximately 45 degrees relative to the longitudinal axis Y. In another embodiment, as shown in FIG. 5, for example, the inner wall 14 may be provided at an acute angle A1 relative to a plane that extends across the inlet opening 15 (or a top 18) of the funnel body 12. In an embodiment, the angle A1 of the inner wall 14 may be within a range between approximately 40 degrees (inclusive) and approximately 60 degrees (inclusive). In an embodiment, the angle A1 of the inner wall 14 may be approximately 52 degrees to approximately 58 degrees. In other embodiments, the angle or slope of the inner wall 14 may vary, for example, based on the size of the outlet opening 30 and/or the inlet opening 15.

The inner wall 14 may also have a length L that extends between the top edge of the inlet opening 15 and an edge of the outlet opening 30, as shown in FIG. 5, for example. In accordance with an embodiment, the length L is approximately 3 inches long. However, it should be understood that the length of the inner wall 14 may vary based on many factors, including, but not limited to, the size or diameter of the donut hole or outlet opening 30, the size or diameter of the assembly or funny body 12, and/or the angle A1 of the sides or inner wall 14 of the funnel body 12. For example, the length L may range from approximately 1.5 inches (inclusive) to approximately 5 inches (inclusive), or more.

The outlet opening 30 has an outlet diameter OD (see FIG. 4). In an embodiment, the size or diameter OD of the outlet opening 30 may vary from as little as approximately 1 inch (inclusive) to as much as approximately 5 inches (inclusive). In one embodiment, the outlet opening 30 may have a diameter OD in the range of approximately 3.75 inches (inclusive) to approximately 4 inches (inclusive). The size of the outlet opening 30 may variably depend on a line speed (speed or rate at which the mixed slurry is being delivered) and the type of product being mixed.

The outlet opening 30 may have an attachment point for the hose 108. In one embodiment, the funnel outlet opening 30 and the elongated hose 108 have a substantially similar inner diameter. For example, the diameters may be approximately 4 inches.

FIG. 2 shows an example of a system like system 100 that includes funnel body 116 at an outlet of the canister 106. As previously described, slurry mixture from the mixer 102 is directed to the canister 116 and then swirled using funnel body 116. The elongated hose 108 is connected to outlet 30 of the funnel body 116. As the slurry mixture exits the funnel body 116, it is communicated and transported through the elongated hose 108, in a laminar fashion along a significant length of the elongated hose 108, to the receiving inlet 109 of the adapter 110 (optional). The slurry mixture exits the deposit outlet 111 and into mixer boot 112 (optional) for placement on paper of a conveyor 114. It is again noted that use of the adapter 110 and/or mixer boot 112 within the system 100 are optional. For example, in accordance with one embodiment, the slurry mixture may be directed out from the canister 106 into the first end 124 of the hose 108, through the length of the hose 108, and out of the second end 126 of the hose 108 onto the paper of conveyor 114.

In accordance with an embodiment, wherein an adapter 110 is used in the system 100, the adapter may also or alternatively have a funnel body 122 associated therewith. FIG. 3 illustrates another embodiment of a system like system 100 wherein both the canister 106 and the adapter include funnel-shaped bodies. Exemplary details of such an adapter are further described below with reference to FIGS. 8 and 9. In an embodiment, the adapter 110 may be used while a mixer boot 112 is not. As previously noted, in another embodiment, only a mixer boot 112 is used with the hose 108. Alternatively, in an embodiment, both an adapter and a mixer boot may be used. In another embodiment, neither the adapter 110 nor the mixer boot 112 are provided in the system 100.

When an adapter is associated with, adapted to, attached to, or connected to second end 126 of hose 108, its configuration is not intended to be limiting.

Figure 7:
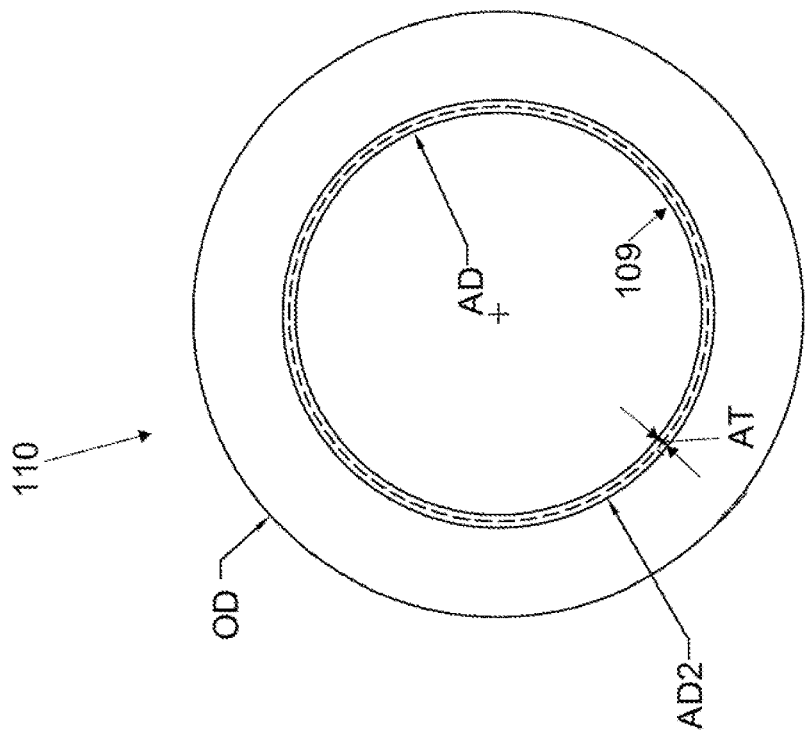
FIGS. 6 and 7 are detailed side and top views, respectively, of an adapter that is adapted for use in the system of FIG. 1 in accordance with an embodiment.
Figure 6:
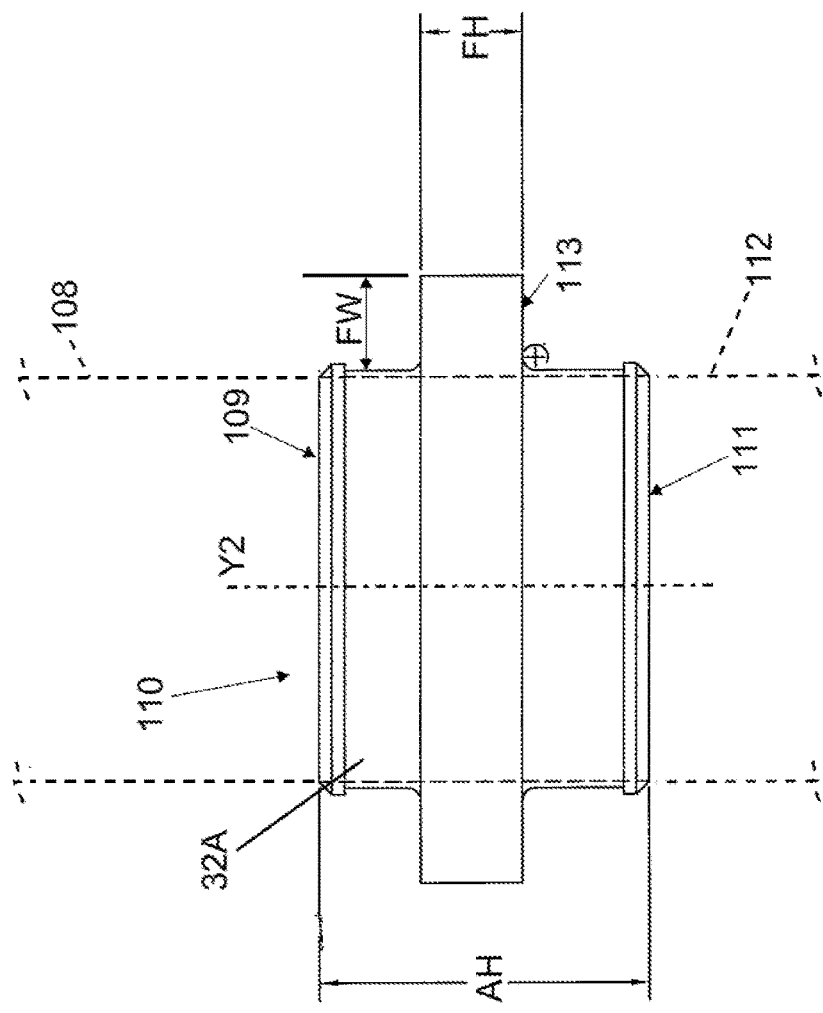

FIGS. 6 and 7 show an example of one embodiment of an adapter 110 configured for use with the hose 108 in the system 100. The adapter 110 has a body portion 32A with its receiving inlet 109 and deposit outlet 111. In an embodiment, as previously described, the receiving inlet 109 is configured for attachment or coupling to the second end 126 of the hose 108. In an embodiment, the deposit outlet 111 may be positioned relative to paper on a conveyor 114 or plate. For example, the adapter 110 of FIGS. 6 and 7 may be attached to an end 126 of the elongated hose 108 when no mixer boot 112 is used in the system. Alternatively, in accordance with another embodiment, the outlet 111 of the adapter 110 may be attached or coupled to an opening of the mixer boot 112.

The adapter 110 has an overall height AH, shown in FIG. 6, and a wall thickness AT, an inner diameter AD, and an outer diameter OD, shown in FIG. 7. The inner diameter AD of the adapter 110 may be consistent or the same from the receiving inlet 109 through to the deposit outlet 111. A thickness AT of the wall of the adapter 110 (AT=AD2 minus AD) may also be consistent between the inlet 109 and outlet 111. Ends of the adapter 110 at the inlet 109 and/or outlet 111 may each include an angled portion, lip, or edge to assist in connection of the adapter to other parts in the system. The lip(s) may extend approximately 0.25 inches to approximately 0.5 inches from the corresponding opening.

In an embodiment, the adapter 110 includes a central flange 113 that extends outwardly relative to a center/axis Y2 of the body of the adapter 110, shown in FIG. 6. The adapter 110 may include a top flange portion and bottom flange portion that each extend in the longitudinal direction (relative to axis Y2), e.g., away from the central flange 113. The top flange portion of adapter 110 may be used for attaching, connecting, or coupling the adapter 110 to the second end 126 of the elongated hose 108, while the bottom flange portion remains open or is connected to an optional mixer boot 112. The central flange 113 may, in some cases, be used to assist in connecting the adapter 110 to the hose 108 or boot 112, for example (e.g., for grasping by a user).

In accordance with an embodiment, the adapter 110 may be formed from stainless steel (e.g., 303 stainless steel). However, in another embodiment, an alternative material, or a mixture of materials, may be used to form the adapter.

In accordance with an embodiment, the funnel outlet 30 of the first funnel body 116, the elongated hose 108, and the receiving inlet 109 of the adapter 110 have a substantially similar inner diameter.

In an embodiment, the overall height AH of the adapter includes a height FH of the central flange 113 plus the heights of the top and bottom flanges (i.e., each of the distances measured from the central flange to either the receiving opening 109 or the deposit outlet 111). In one embodiment, the overall height AH of the adapter is between approximately 4.0 inches to approximately 6.0 inches (both inclusive). In another embodiment, the overall height AH of the adapter 110 is approximately 5.0 inches (inclusive) to approximately 5.5 inches (inclusive). In an embodiment, the flange 113 may have a height FH of approximately 1.0 inches and a width FW of approximately 1.75 inches extending from the outer diameter AD2, for example. However, the height FH and width FW of the flange 113 may vary.

In an embodiment, the outside diameter of the wall, AD2 is approximately 4.1 inches to approximately 4.6 inches (both inclusive). The wall thickness AT of the adapter 110 may be between approximately 0.2 inches and approximately 0.5 inches, inclusive, in accordance with an embodiment.

In one embodiment, the inner diameter AD of the adapter 110 is substantially similar or equal to the diameter D of the hose 108. In an embodiment, the size or diameter AD of the adapter 110 may vary from as little as approximately 1.0 inches (inclusive) to as much as approximately 5.0 inches (inclusive). The inner diameter AD of the adapter 110 may be between approximately 2.0 inches and 4.0 inches, inclusive, in accordance with an embodiment. In one embodiment, the diameter AD may be in the range of approximately 3.75 inches (inclusive) to approximately 4.0 inches (inclusive). The size of the inner diameter AD may variably depend on a line speed (speed or rate at which the mixed slurry is being delivered) and the type of product being mixed. In another embodiment, the inner diameter AD of the adapter 110 is slightly larger than the diameter D of the hose 108, e.g., for placement around the end 126 of the hose 108. In yet another embodiment, the inner diameter AD may be slightly smaller than the diameter D of the hose 108, e.g., the outer diameter OD may also be smaller than the diameter D, e.g., for insertion of the receiving inlet 109 into the hose 108 (e.g., the end 126 of hose 108 covers the outer diameter OD of the adapter 110 and receives a portion of the inlet 109 therein, so that the end 126 encloses the inlet 109 of the adapter 110), or just the inner diameter ID may be smaller (e.g., greater wall thickness for the adapter 110). In another embodiment, the inner diameter AD is substantially similar or equal to a diameter or width of an opening of the mixer boot (if used). In another embodiment, the inner diameter ID of the adapter 110 is slightly larger than the opening of the mixer boot. In yet another embodiment, the inner diameter ID may be slightly smaller than the opening of the mixer boot.

In one particular embodiment, the outside diameter AD2 of the adapter 110 is approximately 4.25 inches, the inner diameter AD is approximately 4.0 inches, and the wall thickness AT is approximately 0.25 inches.

In still yet another embodiment, where a mixer boot 112 is used, the inner diameters (or widths) of the hose 108, adapter 110 (if used), and opening of the mixer boot 112 are all substantially the same or equal in dimension.

In one embodiment, the adapter 110 is configured for attachment, connection, or coupling with an elbow connector, e.g., such as one similar to elbow connector 118 shown in FIGS. 4 and 5, and described in further detail later. In an embodiment, the adapter 110 has an inner diameter AD that is similar or the same in dimension as an inside diameter ED of the elbow connector 118, e.g., approximately 4 inches. In one embodiment, the adapter 110 has an inner diameter AD that is similar or the same in dimension as both the hose 108 and an inside diameter ED of the elbow connector 118, e.g., approximately 4 inches.

FIGS. 8 and 9 illustrate views of adapter 110 having a funnel body 122 adapted to, connected to, associated with, or contained within the adapter 110, in accordance with another embodiment of this disclosure, e.g., such as schematically depicted in the system of FIG. 3. The adapter 110 has a body portion 32 with its receiving inlet 109 and deposit outlet 111. As an example, the receiving inlet 109 of the adapter 110 of FIGS. 8 and 9 may be attached to an end 126 of the elongated hose 108 when the size/diameter of the second end 126 is smaller than an inlet of a mixer boot 112 (the outlet 111 being attached to the inlet). Alternatively, in accordance with another embodiment, the outlet 111 of the adapter 110 may be positioned relative to the paper on the conveyor 114, without using a mixer boot 112. The funnel body 122 of the adapter 110 may be formed as a separate and distinct structure that is connected to and/or inserted into the body 32 of the adapter 110, e.g., near or at its outlet. In another embodiment, the funnel body is formed with or within the adapter 110. The funnel body 122 and adapter 110 may be integrally formed, for example. The body portion of funnel body 122 has an inner wall 34, an outer wall 36, a receiving inlet opening 35, and the deposit outlet opening 111. The inner wall 34 is generally spaced from the outer wall 36 and provided at an angle relative to a longitudinal axis Y2 (described further later) (and, in some cases, at an angle relative to outer wall 36) to direct the slurry mixture poured into the inlets 109, 35 towards the outlet 111.

As shown in FIG. 8, the adapter 100 may include a top flange portion 38 that extends in the longitudinal direction (relative to axis Y2) between the inlet 109 of the adapter and the inlet opening 35 of the funnel body 122. The top flange portion 38 may be used for attaching, connecting, or coupling to the adapter 110 to the second end 126 of the elongated hose 108. In an embodiment, the adapter 110 includes a central flange 39 that extends outwardly relative to a center/axis Y2 of the body of the adapter 110, shown in FIG. 8. The adapter 110 may include a bottom flange portion that extends in the longitudinal direction (relative to axis Y2), e.g., downwardly away from the central flange 39. The bottom flange portion remains open or is configured to be attached, connected, or coupled to an optional mixer boot 112. The central flange 39 may, in some cases, be used to assist in connecting the adapter 110 to the hose 108 or boot 112, for example (e.g., for grasping by a user).

In accordance with an embodiment, the adapter 110 may be formed from stainless steel (e.g., 303 stainless steel). However, in another embodiment, an alternative material, or a mixture of materials, may be used to form the adapter.

In accordance with an embodiment, the funnel outlet 30 of the first funnel body 116, the elongated hose 108, and the receiving inlet 109 of the adapter 110 have a substantially similar inner diameter.

The inlet opening 35 of the funnel body 122 may be provided at, near, or adjacent a mid-portion of the body of adapter 110. In another embodiment, the inlet opening 35 of the funnel body 122 is provided at or near a top of the body of the adapter 110, e.g., top of the flange portion 38. The outlet opening 111 may be provided at or near a bottom portion of the body of the adapter 110. The outlet opening of the funnel and adapter may be the same opening. The inner wall 34 may extend between the inlet opening 35 of the funnel body 122 and the outlet opening 111 of the adapter 110. In an embodiment, the cross-section of the receiving inlet 109 of the adapter is smaller than a cross-section of the deposit outlet 111. In an embodiment, the cross-section of the inlet 35 of the funnel body 122 is smaller than a cross-section the deposit outlet 111. In one embodiment, the receiving inlet 109 and inlet 35 have a similar cross-section and/or diameter (or width). In one embodiment, the outlet opening 111 has a larger diameter than a diameter of the funnel inlet opening 35. In use, the slurry mixture is introduced into the funnel body 122 via the inlet opening 35 from receiving opening 109 that is attached to the elongated hose 108.

The adapter 110 may have an overall height DH2 (see FIG. 8) that includes a height of the funnel FH and a height FH3 measured between the receiving inlet 109 and the inlet opening 35 (i.e., DH2=FH+FH3). The adapter 110 may have an overall height DH2 of approximately 3.25 inches, in accordance with one embodiment. In one embodiment, the funnel body 122 may have a funnel height FH between its inlet 35 and deposit outlet 111 between approximately 1.5 inches and 3.0 inches (both inclusive). In an embodiment, the funnel height FH is approximately 2.0 inches. The distance FH3 between the opening at the receiving inlet 109 (measured from a top edge of the adapter 110) and the funnel inlet 35 may be between approximately 1.0 inches (inclusive) and approximately 2.0 inches (inclusive). The distance FH3 may be approximately 1.25 inches, in accordance with one embodiment. In an embodiment, the flange 39 may have a height FH2 of approximately 1.0 inches (inclusive), but is variable.

The inlet opening 35 has an inlet diameter ID (see FIG. 9). In accordance with an embodiment, the inlet diameter ID and the diameter (AD) of the receiving inlet 109 are substantially the same or equal. In one embodiment, the inlet diameter ID of the inlet opening 35 is substantially similar or equal to the diameter D of the hose 108. In another embodiment, the inlet diameter ID is slightly larger than the diameter D of the hose 108. In yet another embodiment, the inlet diameter ID may be slightly smaller than the diameter D of the hose 108. In an embodiment, the size or diameter ID of the inlet opening 35 may vary from as little as approximately 1.0 inches (inclusive) to as much as approximately 5.0 inches (inclusive). The diameter ID of the inlet opening 35 may be between approximately 2.0 inches and 4.0 inches, inclusive, in accordance with an embodiment. In one embodiment, the inlet opening 35 may have a diameter ID in the range of approximately 3.75 inches (inclusive) to approximately 4.0 inches (inclusive). The size of the inlet opening 35 may variably depend on a line speed (speed or rate at which the mixed slurry is being delivered) and the type of product being mixed. The size of the inlet opening 35 may be the same or similar size as the receiving inlet 109 of the adapter 110, and/or the inner diameter of the elongated hose 108.

The inner wall 34 of the funnel body 122 may be provided at an obtuse angle A2 (see FIG. 8) relative to a plane extending horizontally through the inlet 35 of the funnel 122 or the inlet 109 of the adapter 110 (the plane being perpendicular to longitudinal axis Y2 that extends through a center of the deposit outlet opening 111). (Alternatively, it could be said that the inner wall 34 is provided at an acute angle relative to a longitudinal axis Y2, for example.) The angled, inner wall 34 of the funnel body 122 may assist in substantially reducing and/or eliminating any dead space and/or backup in the mixture or material as it is deposited from the deposit outlet opening 111. In an embodiment, the angle A2 of the inner wall 34 may be within a range between approximately 100 degrees (inclusive) and approximately 120 degrees (inclusive). In an embodiment, the angle A2 of the inner wall 34 may be approximately 111 degrees. In another embodiment, the inner wall 34 has a slope of approximately 45 degrees relative to the longitudinal axis Y2. In other embodiments, the angle or slope of the inner wall 34 may vary, for example, based on the size of the deposit outlet opening 111 and/or inlet 109.

The inner wall 34 may also have a length L2 that extends between the edge of the inlet opening 35 and an edge of the outlet opening 111, as shown in FIG. 8, for example. In accordance with an embodiment, the length L is approximately 2 inches long. However, it should be understood that the length of the inner wall 34 may vary based on many factors, including, but not limited to, the size or diameter receiving opening 109 and/or inlet opening 35, and/or the angle A2 of the sides or inner wall 122 of the funnel body 12. For example, the length L2 may range from approximately 1.5 inches (inclusive) to approximately 5 inches (inclusive), or more.

The opening of the deposit outlet 111 has an outlet diameter OD2 (see FIG. 9). In an embodiment, the size or diameter OD2 of the outlet opening 111 may vary from as little as approximately 2 inch (inclusive) to as much as approximately 6 inches (inclusive). In one embodiment, the deposit outlet opening 111 may have a diameter OD2 in the range of approximately 5.0 inches (inclusive) to approximately 6 inches (inclusive). In one embodiment, the diameter OD2 of the opening is approximately 5.5 inches. The size of the outlet opening 111 may variably depend on a line speed (speed or rate at which the mixed slurry is being delivered) and the type of product being mixed.

Ends of the adapter 110 at the inlet 109 and/or outlet 111 may each include an angled portion, lip, or edge to assist in connection of the adapter to other parts in the system. The lip(s) may extend approximately 0.25 inches to approximately 0.5 inches from the corresponding opening. In one embodiment, a lip of the deposit outlet 111 has an outside diameter OD3 (see FIG. 9) of approximately 6.0 inches.

In one embodiment, the adapter 110 is configured for attachment, connection, or coupling with an elbow connector, e.g., such as one similar to elbow connector 118 shown in FIGS. 4 and 5, and described in further detail later. In an embodiment, the outlet diameter OD2 of the adapter 110 is similar or the same in dimension as an inside diameter ED of the elbow connector 118, e.g., approximately 4 inches. In an embodiment, the outlet diameter OD2 of the adapter 110 may be similar in size as the opening of a mixer boot 112 (if used).

The wall thickness of the top flange portion 38 of the adapter 110 may be between approximately 0.2 inches and approximately 0.5 inches, inclusive, in accordance with an embodiment. The wall thickness around the funnel portion 122 may vary or may be substantially consistent through its length L2.

In one particular embodiment, the diameters AD and ID of the receiving opening 109 and inlet opening 35 are approximately 4.0 inches and the outlet diameter of the deposit outlet 111 is approximately 5.5 inches.

In accordance with an embodiment, the system 100 may include the canister 106 and the adapter 110 as shown in FIGS. 8-9. In one embodiment, the angle A1 of the inner wall 14 of funnel body 116 of the canister may be larger or steeper than the angle A2 of walls of the inner wall 34 of funnel body 122 of adapter 110. Again, both angles A1 and A2 may vary based on any number of factors, including, but not limited to the size of the outlet openings 30, 111 and/or the type of material or product being swirled, induced, and delivered, and/or a line speed, for example.

It will be appreciated that, any dimensions noted above may be adjusted based on the system or apparatus being used, the product or material, the line speed, as well as relatively adjusted based on a desired dimension of the elongated hose 108 attached to the canister 106.

The deposit outlet 111 may have an attachment point for the mixer boot 112. The mixer boot 112 may be positioned around or over the deposit outlet 111 of the adapter 110. In one embodiment, the outlet 111 and the inlet of the mixer boot 112 are substantially similar in size or dimension.

In one embodiment, the mixer boot 112 may include 2.25×7 inch outlet with approximately 6.625 inch inlet. The size of the deposit outlet 111, lip, or attachment point may be based on a size of inlet of the mixer boot 112, in accordance with embodiments herein.

Although throughout this disclosure the mixer boot 112 is generally noted as having a single outlet (or single leg), it should also be understood that more than one outlet may be provided in the mixer boot 112. Different boot configurations may be used for mixer boot 112 to ensure optimal distribution or spread across the table/conveyor 114. For example, a multi-legged boot may include two (or more) outlets, while its inlet may be attached to the end 126 of the elongated hose 108 or attached to the adapter 110. Such a multi-outlet or multi-leg mixer boot 112 may provide additional control over the slurry mixture to ensure that its deposition across the width of the paper, and thus the volume of the formed board, is substantially full and complete across its entire width.

The devices and methods for connecting the ends 124, 126 of the elongated hose 108 to the canister 106 and/or adapter 110 are not limited. In accordance with embodiments herein, one or more elbow connectors 118, hose barbs 121, and/or connection devices may be attached to one or more end(s) 124, 126 of the elongated hose 108 for connection to the canister 106 and/or the inlet 109 and/or deposit outlet 111 of the adapter 110. As shown in FIGS. 4 and 5, for example, an elbow connector 118 may be attached near or to the funnel outlet 30 of the funnel body 116 within canister 106, or to an outlet of a canister 106 without a funnel body therein. FIG. 10 shows one embodiment wherein an elbow connector 118 is attached to the outlet of the canister 106 and to the first end 124 of the elongated hose 108 (via a hose barb 121). The elbow connector 118 may include an inner diameter ED (see FIG. 5) that is similar to the outer diameter OD of the funnel body 116, in one embodiment. In an embodiment, elbow connector 118 may include an inner diameter ED that is similar to the inner diameter ID of the elongated hose 108. In yet another embodiment, the inner diameter ED of the elbow connector 118 is consistent from end-to-end, and thus similar to both the funnel body 116 and inner diameter of the elongated hose 108. In still yet another embodiment, the inner diameter ED of the elbow connector 118 may vary to accommodate for different sizes of the outlet (OD) and the elongated hose (ID). In one embodiment, the inner diameter ED of the elbow connector is approximately 3.75 inches (inclusive) to approximately 4 inches (inclusive). The elbow connector 118 may have a radius R (see FIG. 4) of approximately 6 inches.

In an embodiment, the system 100 includes the elongated hose 108 coming from the elbow connector 118 connected at the bottom of the canister 106, wherein the hose 108 is configured to feed the slurry mixture from its second 126 directly onto the paper, without an adapter 110 or mixer boot 112.

In one embodiment, a frame or structure may be provided in the system for stabilizing, securing, and/or positioning a length or body of the elongated hose 108. For example, the frame or structure may stabilize and position the second end 126 and outlet of the elongated hose 108 at a desired height, angle, and/or position relative to the paper and conveyor 114, such that the slurry mixture is directed and deposited, as desired, thereon (e.g., in a laminar manner). In another embodiment, multiple frames and/or structures may be used or spaced along the length of the elongated hose 108, for positioning and securing the body of the hose 108.

As previously noted, in another embodiment, an elbow connector like connector 118 may be attached to an end of the adapter 110 (not shown) or the inlet of the mixer boot 112.

In accordance with an embodiment, such as shown in FIG. 10, the canister 106 and adapter 110 are positioned such that their axes Y and Y2 are substantially parallel with one another. In one embodiment, the adapter 110 may be positioned adjacent to the canister 106. In another embodiment, the outlets 30 and 111 of the canister 106 and adapter (respectively) are positioned such that they are within a similar plane and/or adjacent to one another.

In order to evaluate and confirm the effect on foam blending into the slurry and resulting gypsum board product, several tests/trials were implemented.

Example Test 1

The test was run using a system similar to the system shown in FIG. 3; i.e., with funnel body 116 and an adapter with funnel body 122 (like adapter 110 of FIG. 8). One end of an elongated hose (108) was installed onto a canister, like canister 106, and the adapter was attached to the opposite end of hose. The tested hose had an inner diameter of approximately four (4) inches, and a four (4) inch elbow connector was also used. Foam was injected into the exit gate for the purposes of the trial. Also, a mixer boot (112) having the same diameter as the hose with a dimensional outlet of seven inches wide by 2.25 inches high (7"W× 2.25"H) was utilized at the opposite end of the hose (near the adapter). The hose had a vertically positioned portion. The system and product were observed during processing. The slurry looked very smooth as it was streamed. Also, no blisters were found during the trial. It was also determined that a differential density across the forming table (i.e., across its width, e.g., from right side to left side) decreased by more than fifty percent (50%) as foam weight was lowered for subsequent runs—e.g., from 5-8 grams (prior to the trial) to less than 2 grams during the trial; this means that the system improves foam blending (as designed). Lowering of both the foam weight and soap usage also improved nail pulls.

Example Test 2

The test was run using parts from a system similar to the system shown in FIG. 2, but with no adapter (110) and no mixer boot (112); i.e., using only funnel body 116. One end of an elongated hose (108) was installed onto a canister, like canister 106, while the opposite end of hose was positioned relative to the paper on the conveyor and secured using a frame. The tested hose had an inner diameter of approximately four (4) inches, and a four (4) inch elbow connector was also used. Foam was injected into the exit gate for the purposes of the trial. The hose had a horizontally positioned portion. The system and product were observed during processing. There was smooth and laminar slurry flow through the hose, with no spin, but flow from an end of hose (out to the paper) was generally at a higher velocity.

These example tests and trial runs, utilizing the system configurations above (each including at least the canister 106 and elongated hose 108) resulted in producing a smoother slurry mixture, of more consistent density, exiting the hose (whether with or without a mixer boot and/or adapter). The hose did not cause the mixer to increase load in any of the tests (in some cases, it actually decreased the load on the mixer). Core splits and blisters in the produced products may be substantially reduced and/or eliminated. Build up on parts (as a result of the flowing slurry) may be minimal, or none at all, depending on the configuration and features of the parts in the system. Also, by implementing use of the elongated hose, no speed restriction (i.e., line speed) is necessary for ⅝ inch products (vs. ½ inch products) (further details are described later, below).

Accordingly, as confirmed via results of the tests, the herein disclosed system using at least canister 106 and the elongated hose 108, enhances mixing and forces blending of the slurry with the foam, substantially reducing and/or eliminating the normal liabilities of blisters and deep core splits associated with low density foam and high air usage. More mixing residence time in and through the hose allows the foam to coalesce before forming the board. As a result, the foam formulation added by injector 104 may be optimized. The resulting optimized foam formulation may be lower in density, with increased foam air and decreased soap, thus creating a more open core (bigger bubbles) that contributes to higher core strength, easier drying, and improved nail pulls (in the finished product). The disclosed system, including the combination of the described canister and elongated hose, eliminates normal issues typically associated with lower density foam and higher air usage that typically make it very difficult to blend to the foam into the slurry because the disclosed system forces blending of the slurry with the foam in a number of locations, e.g., exit gate and/or canister, and elongated hose. It also produces a reduction in the product/gypsum board weight.

As such, the combination of using at least the canister 106 with its funnel body 116 and the elongated hose 108 in the disclosed system results in an improved and higher quality formed gypsum board product. The structures of the canister 106 and funnel body 116 further induce a swirl into the slurry mixture (as received from the mixer 102) as it flows therethrough, and reduces the flow rate of the slurry mixture, to blend the gypsum slurry and foam together. The elongated hose 108 further blends the gypsum slurry and foam together as the slurry mixture moves along its length and between its ends. Laminar flow imparted to the slurry mixture in the elongated hose 108 also reduces turbulence while still allowing and forcing blending. Thus, the output or deposited slurry mixture from the hose 108 (either directly therefrom, or via optional adapter 110 and/or via optional mixer boot 112) is a more homogeneous slurry mixture, having larger air pockets or bubbles therein that are more evenly distributed and consistently incorporated throughout the slurry. As a result, once the gypsum board product is formed and complete (e.g., dried), it has higher strength, with less blistering, core splits, and cracks, thereby improving both performance and aesthetic.

Figure 11:
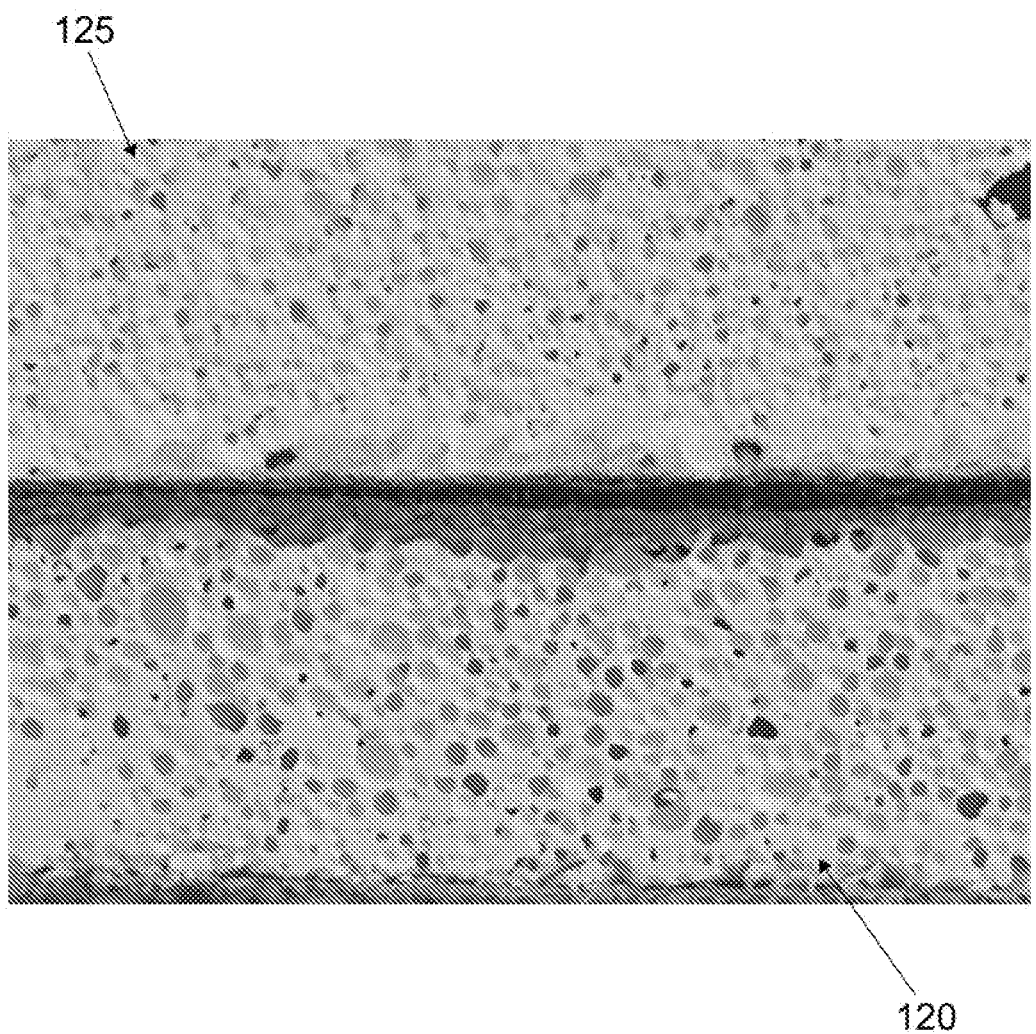
FIG. 11 shows a comparison of a core formed using a standard/prior art system and method versus a core formed using the herein disclosed system and method.
Figure 12:
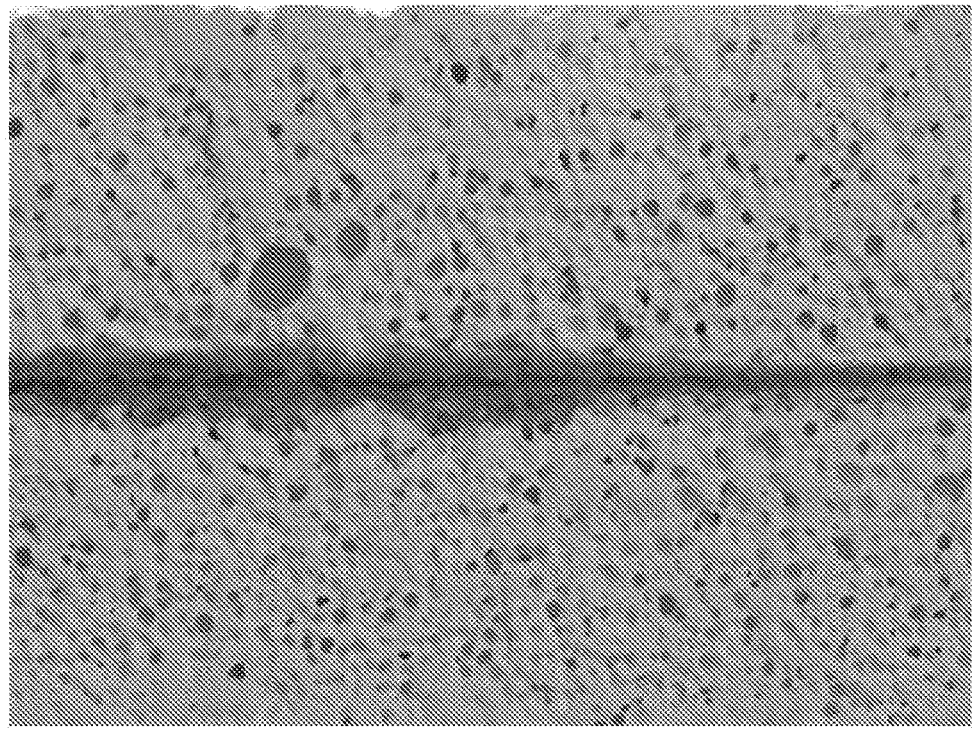
FIG. 12 shows exemplary photos of a cross section of standard core formed using known systems and methods.
Figure 13:
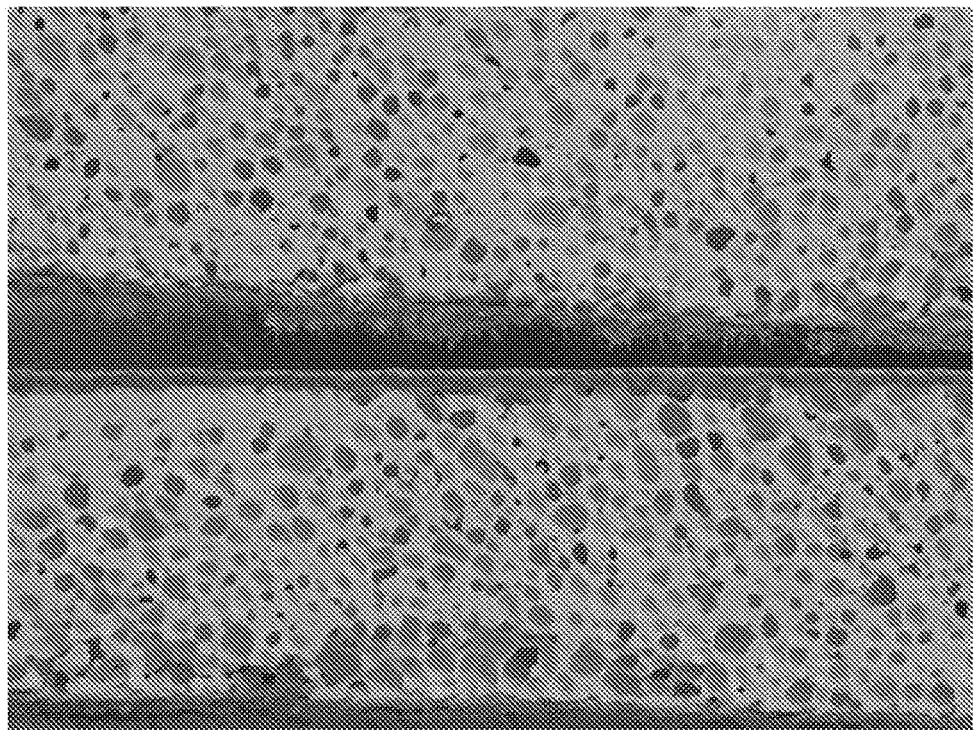
FIG. 13 shows exemplary photos of a cross section of a core formed using the disclosed system and method in accordance with embodiments of this disclosure.

FIG. 11 provides a visual comparison (in the form of photographs) of the enhanced formed product formed as a result of using the herein disclosed system 100 and method for forming gypsum board vs. standard formed product. A product with a ½ inch core 125, formed using a standard, known/prior art system, is shown on top, while another product with a ½ inch core 120, formed using the disclosed system 100, i.e., formed using at least the canister 106 and elongated hose 108, is shown on bottom. Specifically, the product/core 125 was formed using a system that had a normal/known mixer gate, a standard (e.g., cylindrical) canister, a donut (e.g., having a top and bottom portion), and a mixer boot attached to the donut, with no hose or attachments provided on the devices or in the canister. The product/core 120 was formed using a system as described herein: e.g., using a mixer gate, a canister like canister 106 having funnel body 116 therein, an integral rigid elbow connector, an elongated hose like hose 108, an adapter/reducer like adapter 110 at the second end of the hose 108, and a mixer boot like boot 112 attached to the adapter 110. As compared to the standard core 125, FIG. 11 shows that the core 120 includes a more open core, i.e., bigger voids (as a result of bubbles from improved distribution of foam throughout the slurry mixture) that are distributed throughout a thickness of the formed core 120. Such a core 120 includes features and advancements over a standard core 125, such as those noted above. FIG. 13 further shows photographic examples (two pieces of a core are shown) of the improvements to the core 120 of a formed board product using one embodiment of the system 100; specifically, as noted above, the core of FIG. 13 was formed using a system 100 including a mixer gate, a canister 106 having funnel body 116 therein, an integral rigid elbow connector, an elongated hose 108, an adapter 110 at the second end of the hose 108, and a mixer boot 112 attached to the adapter 110. As shown, the formed core of FIG. 13 has larger size voids that are more consistent in size and more evenly distributed throughout the core, i.e., across its length and width. However, a core formed using the above noted standard systems and methods—such as the cores shown in the photos of FIG. 12 (two pieces of a core are shown) which are similar to core 125 and were formed using a standard system having a known mixer gate, a standard (e.g., cylindrical) canister, a donut, and a mixer boot attached to the donut, with no hose or attachments provided on the devices or in the canister—has generally smaller voids with random larger sized voids that are inconsistent and sporadically placed throughout the length and width of the core.

In addition, the disclosed configuration improves runability of the system for an extended period of time. The disclosed system provides the ability to run smaller slumps, resulting in improved calipers, improved edge formation, and improved face appearance in the gypsum board product. There may also be a reduction in evaporation and resulting gas usage savings.

Moreover, as shown in FIG. 1, for example, the use of the elongated hose and adapter provide the ability to move the mixer "offline" relative to the plate, board or a conveyor that positions the paper for receipt of the slurry mixture. The mixer may be provided adjacent to or beside the board, for example, instead of above or behind the board or conveyor, as is typically known. This helps decrease paper breaks (e.g., from falling mixer debris onto the paper, which typically can create breaks in the conveyed paper), for example. Also, moving the mixer offline allows for easier addition of additives because there may be more room outside in the environment around the mixer as compared to when the mixer is positioned in line with the conveyor and provided in a fixed space or area. Additionally, moving the mixer offline also results in less operational downtime and more flexibility with product scheduling; the mixer change out time could be decreased dramatically (e.g., from about 45 minutes to 15 minutes) by being positioned offline. It provides in easier access for operators to clean the machinery as well as provide safer conditions for tending to problems.

Further, by moving the mixer offline, the mixer boot may also be moved further back from the forming station (since the mixer is no longer constraining the location of the boot attachment, and is no longer in the way). Moving the mixer boot back allows for more effective forming table/board/conveyor length (i.e., its lengthens the table, since the boot is limited with regards to covering a portion of the table), and also gives more time to spread the slurry, which could allow line speed increases—thus avoiding a traditional bottleneck for certain line speeds, and more time for the table vibrators to agitate the slurry to remove large, unwanted bubbles, thereby helping to eliminate voids.

Furthermore, flexibility in the position or arrangement of the length of the hose 108 provides improvements with regards to space considerations and/or limitations. Note that the features (e.g., measurements such as length) and position or arrangement of the length of the elongated hose 108 between its ends (i.e., from the canister to the paper) is not intended to be limited. Depending upon the features and a position of the elongate hose and its output end (second end)—e.g., relative to the paper/board—placement of the elongated hose in the system may reduce and/or eliminate potential issues related to too much coalescence residence time and/or separation of dense slurry and light foam in the mixed slurry that is deposited onto the paper/board, for example.

Also, use of the canister and elongated hose with the optional mixer boot and/or optional adapter may result in less mixer build up and formation of lumps in the deposited slurry mixture. Moreover, using at least the mixer boot at the second end of the hose may further improve the system such that it: induces further blending of the slurry and foam, allows for expansion of the slurry mixture as it moves out of the hose, allows density across the slurry mixture to equalize, reduces splatter onto the paper as the slurry mixture exits the hose, as well as reduce and/or eliminate core splits in the formed board/product.

An additional benefit of the herein disclosed system 100, as briefly mentioned above, is the ability to better match mixer set up to different density and different speed products; e.g., ⅝ inch products may be run without being restricted on line speed. Historically, mixer set up has been a compromise between optimization for slower, denser products and faster, low density products. What works best for ½" products and its needs of good foam blending, good mixer fill, and lump prevention, has not necessarily worked best for ⅝" products and its needs, e.g., its need of high mixer throughput. The capability to produce both products with the same mixer results in compromises. Most frequently, the mixer is biased for ½" production, which results in speed losses for ⅝" products. In accordance with an embodiment, optimization for ½" products may be accomplished in system 100 by fitting a smaller, narrower exit gate 105 to the mixer 102. In addition, the gate 105 may typically be the area where foam is injected from injector 104 into the slurry stream. Using a smaller exit gate 105 helps ensure the passageway is completely filled, which ensures that the foam is homogenously blended into the slurry. However, using a smaller exit gate 105 may also unfortunately force a reduction in throughput on ⅝" products, since the amount of flow through such a smaller exit gate 105 may be limited by its smaller (outlet) size. Nonetheless, the disclosed system 100 with its elongated hose 108 largely reduces and/or substantially eliminates compromises with regards to the exit gate 105 size. That is, the disclosed system allows for any sized gate—including a larger, funnel-type mixer gate—to be used for both ⅝" and ½" products, in accordance with an embodiment, if so desired. Generally, a larger gate could have compromised foam blending in the past (e.g., for reasons noted above). However, because foam is further blended in the slurry mixture as it moves through the elongated hose 108 of system 100, the system 100 does not rely solely on the exit gate 105 for foam blending (as in traditional configurations). Thus, the mixer can be optimized for ½" products without compromising the throughput and line speed of ⅝" products (e.g., by using a larger exit gate or funneled exit gate (that has a wider or larger gate outlet)).

It should be understood, based on the disclosure above, that this disclosure further provides a method for mixing a slurry mixture for making gypsum board. The method as disclosed herein may utilize a system as shown in FIG. 1, for example, including the mixer, the foam injector, the canister and its funnel body, and the elongated hose. The method may include, for example, mixing the slurry at a first flow rate; injecting foam into the mixed slurry to form the slurry mixture (at one or a number of places previously described); inducing a swirl to the slurry mixture using the canister; and depositing the slurry mixture via the deposit outlet of the adapter onto paper to form the gypsum board. The slurry mixture is directed from the canister and through the elongated hose, before the depositing onto the paper. In one embodiment, an adapter is provided, and the slurry mixture is directed from the elongated hose into the receiving inlet of the adapter, before being deposited onto the paper. In an embodiment wherein the system includes a mixer boot, the method may include receiving, in the mixer boot, the slurry mixture from the hose or the adapter (if provided); and depositing the slurry mixture from the mixer boot onto paper to make gypsum board.

The method of manufacturing and materials used to form the disclosed system 10 are not intended to be limited. In an embodiment, the funnel body 116 and/or 122 may be formed from stainless steel and chrome plated or coated on at least the inner walls therein. In another embodiment, one or more parts of the system 10 may be formed from plastic. For example, the funnel body 116 and/or 122 may be formed from plastic.

Although not described in great detail herein, it should be understood by one of ordinary skill in the art that the materials mixed and used in the system 100 are not intended to be limited. For example, the gypsum may be a calcined gypsum or hydrated calcium sulphate (e.g., semi-hydrate calcium sulphate, calcium sulfate hemihydrate or anhydrite, anhydrous calcium sulphate or anhydrite (type II or type III), or CaSO4.2(H20), CaSO4.0.5H20, or CaSO4) and is not limited to such. Accordingly, a calcined gypsum slurry may be mixed and flow induced therein. Further, it should be understood that reference to the "slurry mixture" is not limited to just slurry and foam, and that such a "slurry mixture" may also include products or additives to the mixture such as accelerators, retarders, fillers, binders, etc.

Also, the parts of the system 100 as illustrated are not intended to be limiting. Alternate and/or additional parts may be provided as part of system 100 that utilizes the elongated hose 108, adapter 110, and/or funnel bodies 116 and/or 122 as disclosed herein.

Further, although described herein as being used with a gypsum slurry to produce a gypsum board (or plasterboard) with a gypsum core covered with sheet(s) of paper, it should be understood that the herein disclosed apparatus may be provided in alternate systems or assemblies and/or may be used with other aqueous slurries or solutions, for example, that are mixed or poured and dispensed or output using an outlet to form other products, and thus are not just limited to systems for mixing and depositing gypsum slurry to form gypsum boards.

Moreover, although specific dimensions and ranges have been noted in this disclosure for different parts of the system, these dimensions and ranges are not intended to be limiting in any way. The sizes and geometries of one part may be adjusted based on sizes and geometries of another part to which it is attached, connected, or coupled to. For example, diameters of the elongated hose, adapter, and/or mixer boot openings (inlet and outlet(s)) may be altered for velocity and/or product changes. Also, the positioning of the parts of the system are not intended to be limited to the schematic drawings provided herewith.

While the principles of the disclosure have been made clear in the illustrative embodiments set forth above, it will be apparent to those skilled in the art that various modifications may be made to the structure, arrangement, proportion, elements, materials, and components used in the practice of the disclosure.

For example, in accordance with some embodiments, the funnel body 116 and/or canister 106 may include one or more baffles provided on its inner walls. In an embodiment, baffles such as those described in U.S. application Ser. No. 15/142,090, filed Apr. 29, 2016 and which is incorporated by reference in its entirety herein, may be provided on the inner wall 14 of the funnel body 116. In an embodiment, baffles like those in the incorporated '090 application may be provided in the canister 106. In another embodiment, the funnel body 116 may include one or more features described in the incorporated '090 application that are related to its funnel body, including, but not limited to: an angle and/or a slope of the inner wall, size or diameter of the inlet opening and/or outlet opening, and/or outlet height.

It will thus be seen that the features of this disclosure have been fully and effectively accomplished. It will be realized, however, that the foregoing preferred specific embodiments have been shown and described for the purpose of illustrating the functional and structural principles of this disclosure and are subject to change without departure from such principles. Therefore, this disclosure includes all modifications encompassed within the spirit and scope of the following claims.

What is claimed is:

1. A gypsum board comprising a gypsum core covered by a sheet, the gypsum core made with a foamed gypsum slurry and including a plurality of voids, wherein the plurality of voids are distributed throughout the gypsum core across a length, a width and a thickness of the gypsum core, wherein the gypsum core is made with a system including a mixer constructed and arranged to mix slurry and direct the mixed slurry to an exit gate, a foam injector constructed and arranged to inject foam into the mixed slurry to form a slurry mixture, a canister connected to the mixer and constructed and arranged to induce a swirl to the slurry mixture; a first funnel body being connected to the canister and having: a funnel inlet for receiving the slurry mixture from the canister, an angular inner wall, and a funnel outlet, the funnel outlet having a circular cross-section that is smaller than a cross-section of the funnel inlet and centered with respect to the first funnel body, the angular inner wall extending between the funnel inlet and the funnel outlet and being angled relative to a center of the funnel outlet to direct the slurry mixture poured into the funnel inlet from the canister towards the funnel outlet; and an elongated hose having a first end coupled to the funnel outlet of the first funnel body and a second end for depositing the slurry mixture onto a moving conveyor, the elongated hose having a length that is sufficient to impart the slurry mixture with a laminar flow between the first end and the second end of the elongated hose, wherein the funnel outlet of the first funnel body and the elongated hose have a substantially similar inner diameter; the gypsum board obtained by:

mixing the slurry at a first flow rate;

injecting foam into the mixed slurry to form the slurry mixture;

inducing a swirl to the slurry mixture using the canister;

receiving the slurry mixture from the canister and in the funnel inlet and directing the slurry mixture along the angular inner wall and towards the funnel outlet; and depositing the slurry mixture via the second end of the elongate hose onto the moving conveyor to form the gypsum board, wherein the slurry mixture is directed from the canister and through the elongated hose before the depositing onto the conveyor, and wherein the plurality of voids include different size voids and wherein larger voids of the different size voids are distributed throughout the gypsum core across a length, a width and a thickness of the core.

2. The gypsum board of claim 1, wherein foam in the foamed gypsum slurry has coalesced before the foamed gypsum slurry forms the core of the gypsum board.

3. The gypsum board of claim 1, wherein the system further includes an adapter, wherein the second end of the elongated hose is directly attached to the adapter, the adapter having a substantially circular receiving inlet for receiving the slurry mixture and a deposit outlet for depositing the slurry mixture onto the moving conveyor, and wherein a cross-section of the receiving inlet of the adapter and the elongated hose are smaller than a cross-section of the deposit outlet.

4. The gypsum board of claim 1, wherein the sheet is a paper or board.

5. A method for making gypsum board having a gypsum core and a plurality of voids that are distributed throughout the gypsum core across a length, a width and a thickness of the core, the method comprising:
increasing bubble size in a foamed gypsum slurry used to make the gypsum core by improving distribution of foam throughout, wherein the improved distribution of foam is a result of:
mixing slurry at a first flow rate;
injecting foam into the mixed slurry to form a slurry mixture with bubbles therein;
inducing a swirl to the slurry mixture; and, thereafter, imparting laminar flow to the slurry mixture to reduce turbulence and blend the slurry mixture and foam together into a homogeneous mixture;
forcing coalescence of the bubbles in the slurry mixture, and
wherein the slurry mixture is configured for depositing on a sheet to form the gypsum board,
wherein the plurality of voids are distributed throughout the gypsum core across the length, the width and the thickness of the core, and
wherein the gypsum core is made with a system including a mixer constructed and arranged to mix slurry and direct the mixed slurry to an exit gate, a foam injector constructed and arranged to inject foam into the mixed slurry to form a slurry mixture, a canister connected to the mixer and constructed and arranged to induce a swirl to the slurry mixture; a first funnel body being connected to the canister and having: a funnel inlet for receiving the slurry mixture from the canister, an angular inner wall, and a funnel outlet, the funnel outlet having a circular cross-section that is smaller than a cross-section of the funnel inlet and centered with respect to the first funnel body, the angular inner wall extending between the funnel inlet and the funnel outlet and being angled relative to a center of the funnel outlet to direct the slurry mixture poured into the funnel inlet from the canister towards the funnel outlet; and an elongated hose having a first end coupled to the funnel outlet of the first funnel body and a second end for depositing the slurry mixture onto a moving conveyor, the elongated hose having a length that is sufficient to impart the slurry mixture with said laminar flow between the first end and the second end of the elongated hose,
wherein the funnel outlet of the first funnel body and the elongated hose have a substantially similar inner diameter; the gypsum board obtained by:
mixing the slurry at a first flow rate;
injecting foam into the mixed slurry to form the slurry mixture;
inducing a swirl to the slurry mixture using the canister;
receiving the slurry mixture from the canister and in the funnel inlet and directing the slurry mixture along the angular inner wall and towards the funnel outlet; and
depositing the slurry mixture via the second end of the elongate hose onto the moving conveyor to form the gypsum board,
wherein the slurry mixture is directed from the canister and through the elongated hose before the depositing onto the conveyor, and
wherein the plurality of voids include different size voids and wherein larger voids of the different size voids are distributed throughout the gypsum core across a length, a width and a thickness of the core.

6. The method of claim 5, wherein the bubbles in the slurry mixture are of different sizes, and wherein the inducing the swirl and the imparting of laminar flow aids in substantially even distribution of the bubbles throughout the slurry mixture.

7. The method of claim 5, wherein the inducing the swirl comprises reducing the flow of the slurry mixture to a second flow rate, the second flow rate being lower than the first flow rate.

8. The method of claim 5, wherein the imparting the laminar flow comprise increasing a flow rate of the slurry mixture to a second flow rate that is different than the first flow rate.

9. A foamed gypsum board comprising a core and voids that are distributed throughout the core across a length, a width and a thickness of the core, the core being obtained with a foamed gypsum slurry in which foam has coalesced before forming the board,
wherein the gypsum core is made with a system including a mixer constructed and arranged to mix slurry and direct the mixed slurry to an exit gate, a foam injector constructed and arranged to inject foam into the mixed slurry to form a slurry mixture, a canister connected to the mixer and constructed and arranged to induce a swirl to the slurry mixture; a first funnel body being connected to the canister and having: a funnel inlet for receiving the slurry mixture from the canister, an angular inner wall, and a funnel outlet, the funnel outlet having a circular cross-section that is smaller than a cross-section of the funnel inlet and centered with respect to the first funnel body, the angular inner wall extending between the funnel inlet and the funnel outlet and being angled relative to a center of the funnel outlet to direct the slurry mixture poured into the funnel inlet from the canister towards the funnel outlet; and an elongated hose having a first end coupled to the funnel outlet of the first funnel body and a second end for depositing the slurry mixture onto a moving conveyor, the elongated hose having a length that is sufficient to impart the slurry mixture with said laminar flow between the first end and the second end of the elongated hose,
wherein the funnel outlet of the first funnel body and the elongated hose have a substantially similar inner diameter; the gypsum board obtained by:
mixing the slurry at a first flow rate;
injecting foam into the mixed slurry to form the slurry mixture;
inducing a swirl to the slurry mixture using the canister;

receiving the slurry mixture from the canister and in the funnel inlet and directing the slurry mixture along the angular inner wall and towards the funnel outlet; and depositing the slurry mixture via the second end of the elongate hose onto the moving conveyor to form the gypsum board, wherein the slurry mixture is directed from the canister and through the elongated hose before the depositing onto the conveyor.

10. The foamed gypsum board of claim 9, wherein the voids comprise different size voids.

11. The foamed gypsum board of claim 9, wherein the core is provided between sheets of paper or board.

12. The foamed gypsum board of claim 9, wherein the core is covered by a sheet.

\* \* \* \* \*